Oct. 17, 1933. L. C. PEARCE 1,931,155
METHOD OF AND APPARATUS FOR APPLYING ENVELOPE FASTENERS
Filed Dec. 21, 1931 13 Sheets-Sheet 1
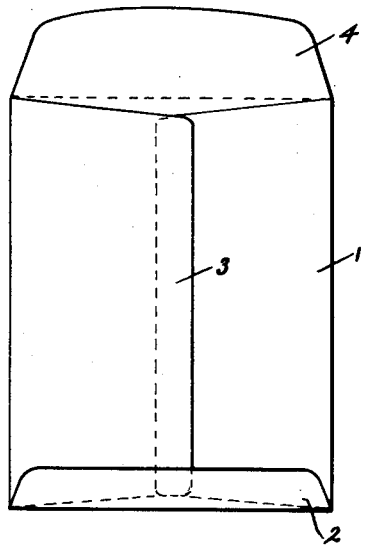
Fig. 1
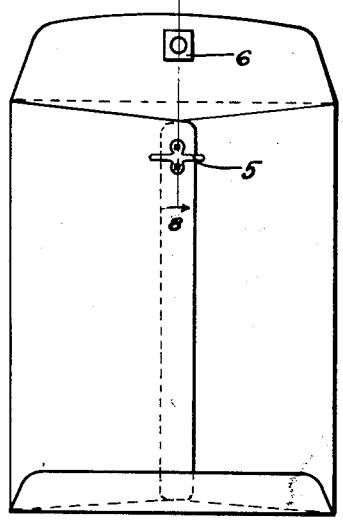
Fig. 2
Fig. 3
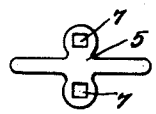
Fig. 4
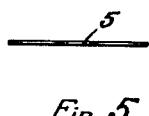
Fig. 5
Fig. 6
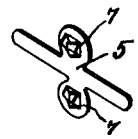
Fig. 7
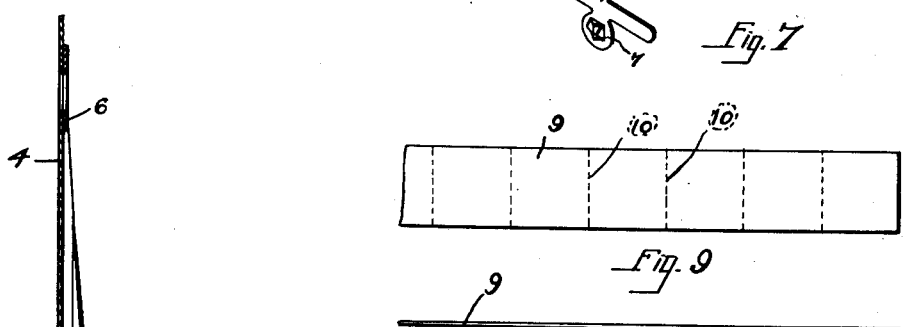
Fig. 9
Fig. 10
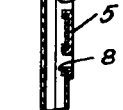
Fig. 8
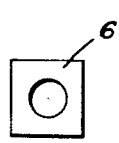
Fig. 11
INVENTOR.
Lewis C. Pearce
BY
Fay Oberlin & Fay
ATTORNEYS.

Oct. 17, 1933. L. C. PEARCE 1,931,155
METHOD OF AND APPARATUS FOR APPLYING ENVELOPE FASTENERS
Filed Dec. 21, 1931 13 Sheets-Sheet 7

INVENTOR.
Lewis C. Pearce
BY
Fay Oberlin & Fay
ATTORNEYS.

Oct. 17, 1933.    L. C. PEARCE    1,931,155
METHOD OF AND APPARATUS FOR APPLYING ENVELOPE FASTENERS
Filed Dec. 21, 1931    13 Sheets-Sheet 8

INVENTOR.
Lewis C. Pearce
BY
Fay Oberlin & Fay
ATTORNEYS.

Oct. 17, 1933.  L. C. PEARCE  1,931,155
METHOD OF AND APPARATUS FOR APPLYING ENVELOPE FASTENERS
Filed Dec. 21, 1931    13 Sheets-Sheet 9
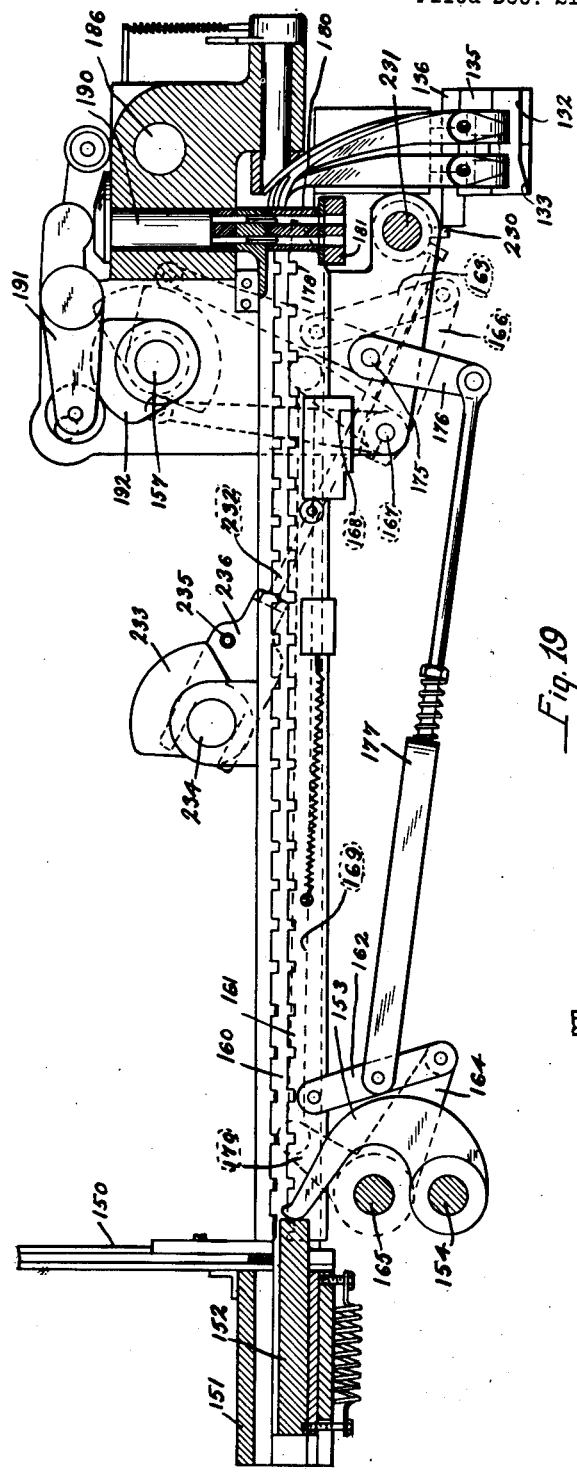
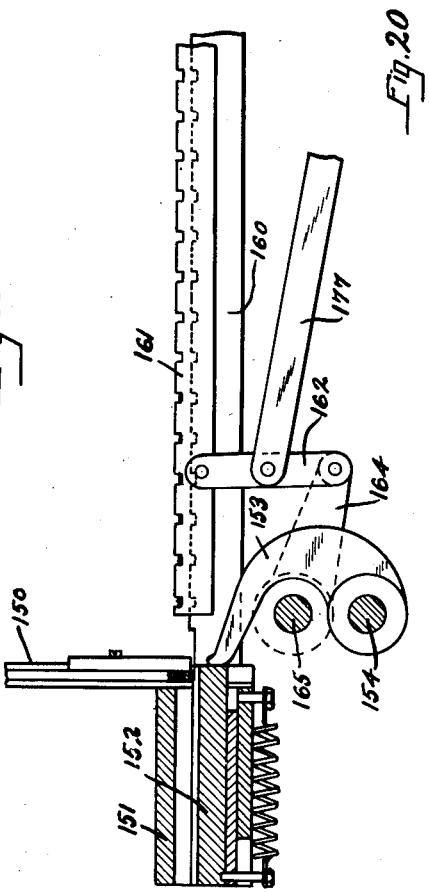
INVENTOR.
Lewis C. Pearce
BY
Fay Oberlin & Fay
ATTORNEYS Oct. 17, 1933.                L. C. PEARCE                1,931,155
        METHOD OF AND APPARATUS FOR APPLYING ENVELOPE FASTENERS
                    Filed Dec. 21, 1931      13 Sheets-Sheet 10
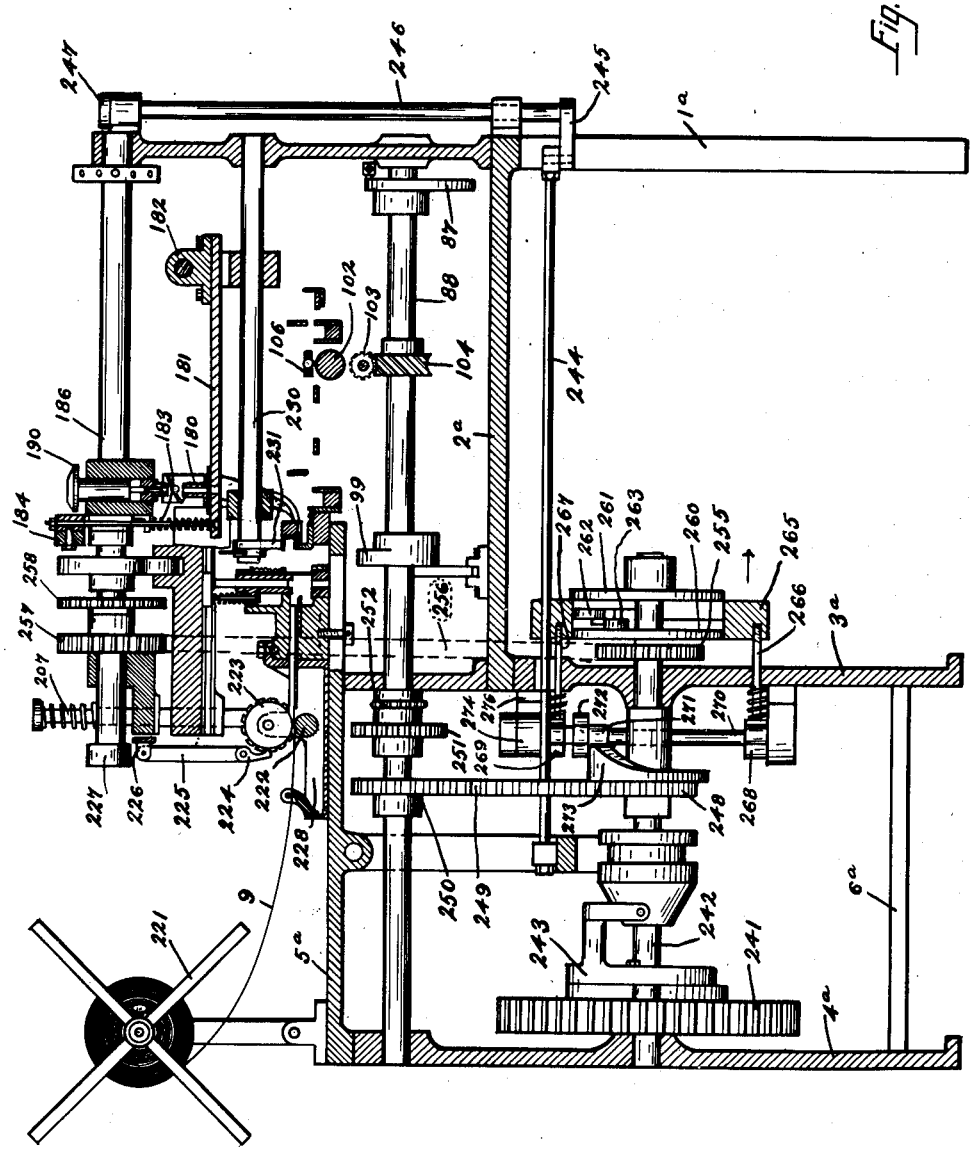
INVENTOR.
Lewis C. Pearce
BY
Fay Oberlin & Fay
ATTORNEYS.

Oct. 17, 1933.  L. C. PEARCE  1,931,155
METHOD OF AND APPARATUS FOR APPLYING ENVELOPE FASTENERS
Filed Dec. 21, 1931  13 Sheets-Sheet 11
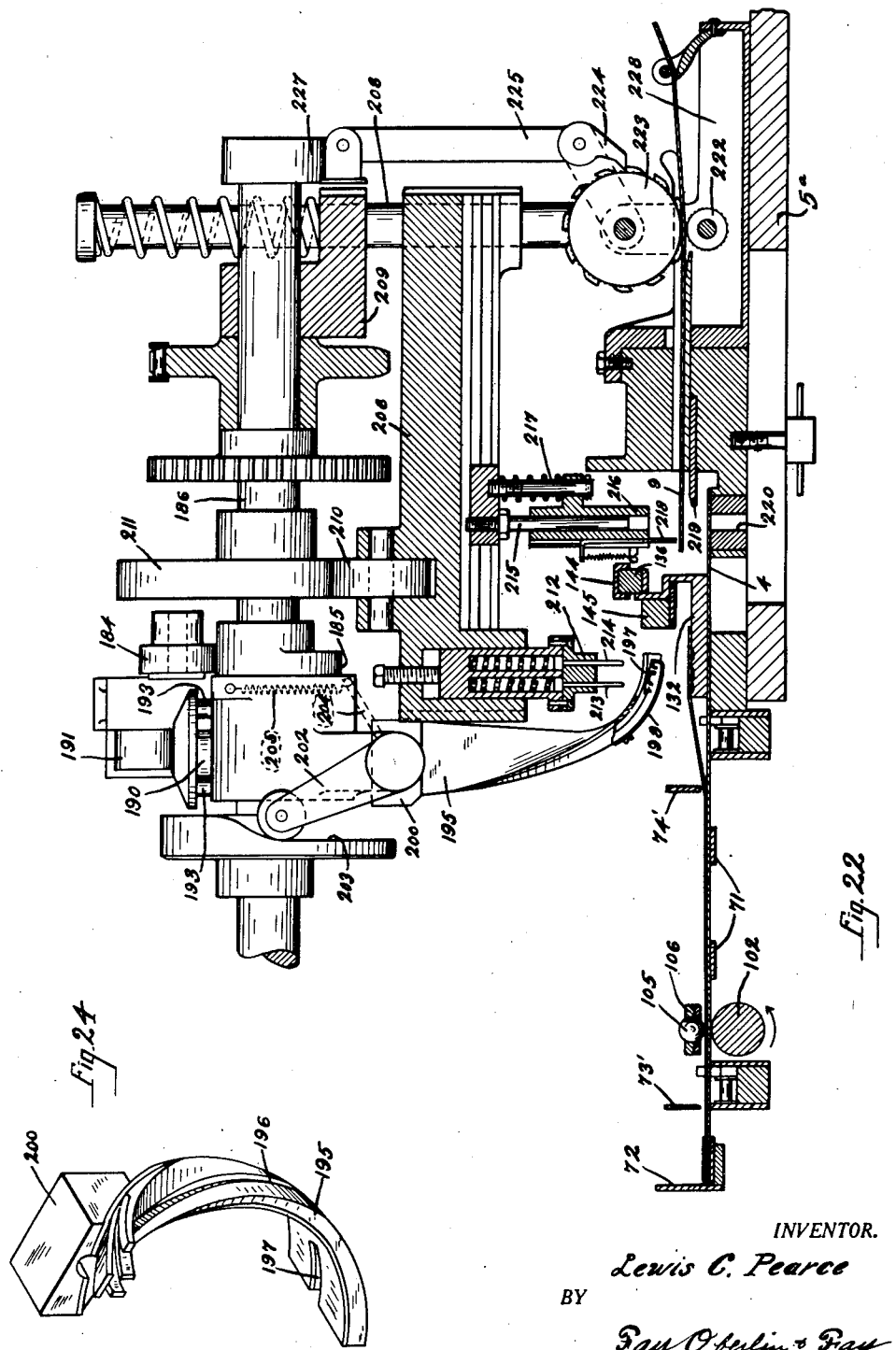
INVENTOR.
Lewis C. Pearce
BY
Fay Oberlin & Fay
ATTORNEYS.

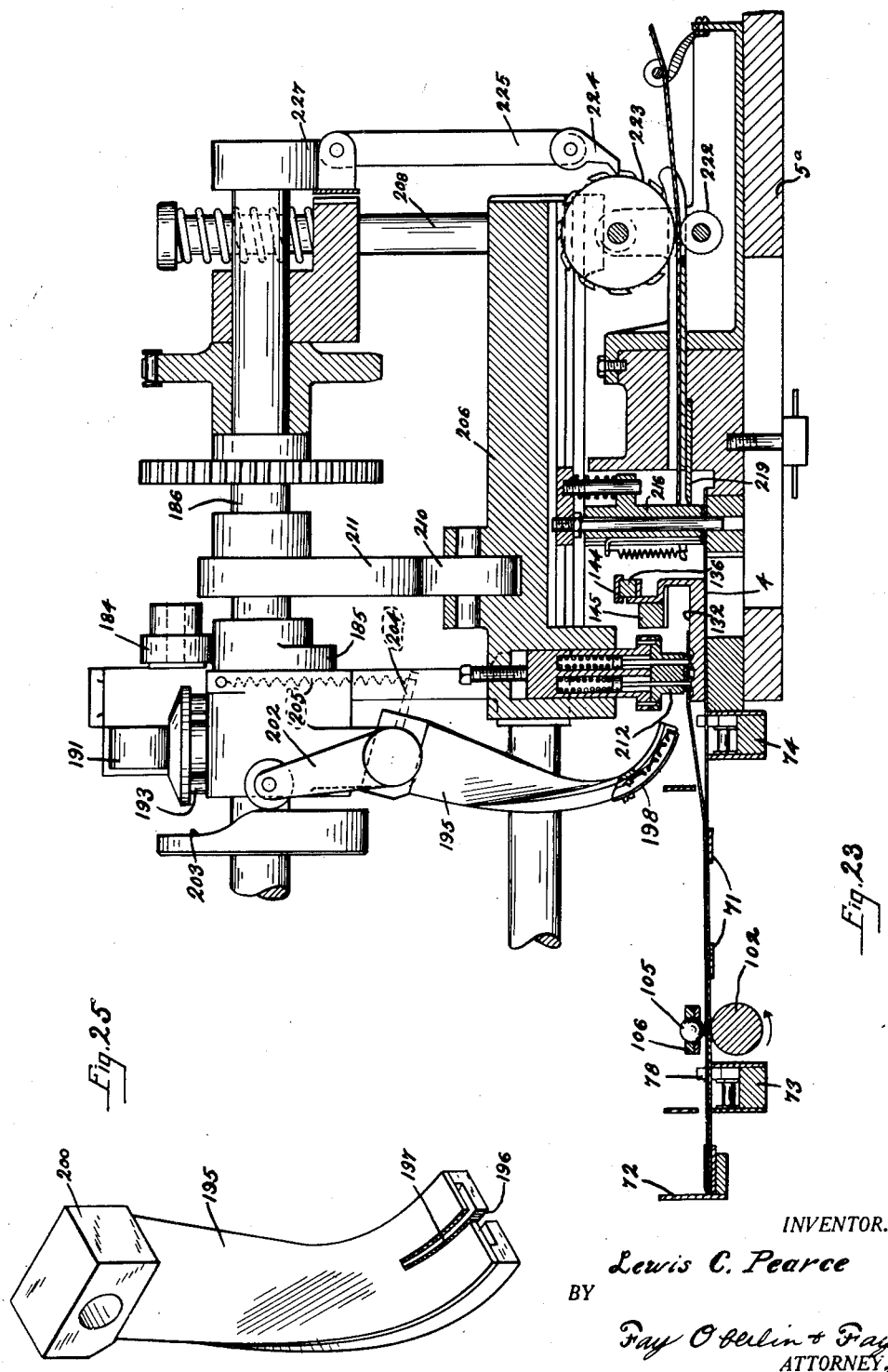

Oct. 17, 1933.  L. C. PEARCE  1,931,155
METHOD OF AND APPARATUS FOR APPLYING ENVELOPE FASTENERS
Filed Dec. 21, 1931  13 Sheets-Sheet 13
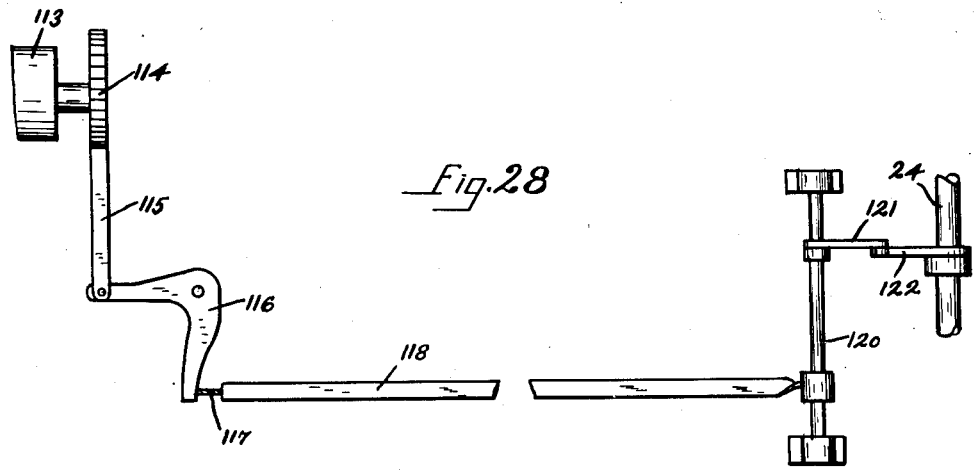
Fig. 28
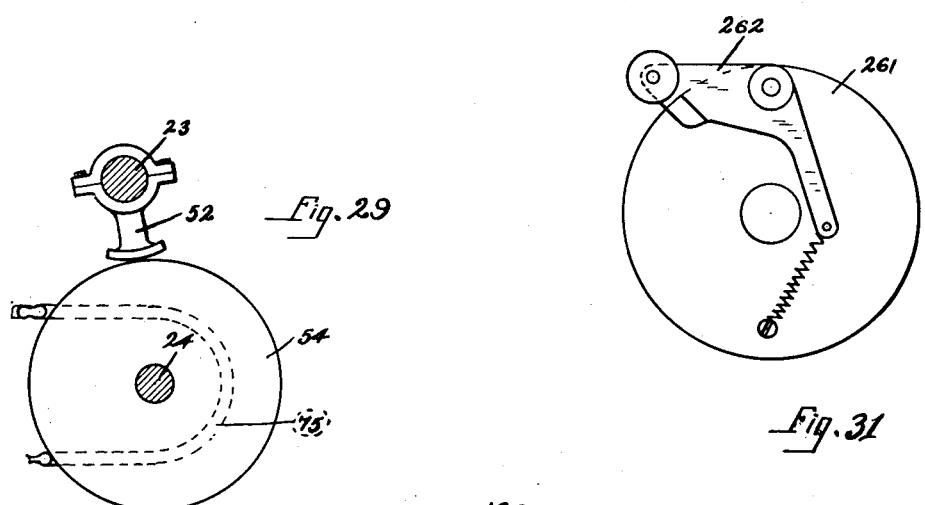
Fig. 29
Fig. 31
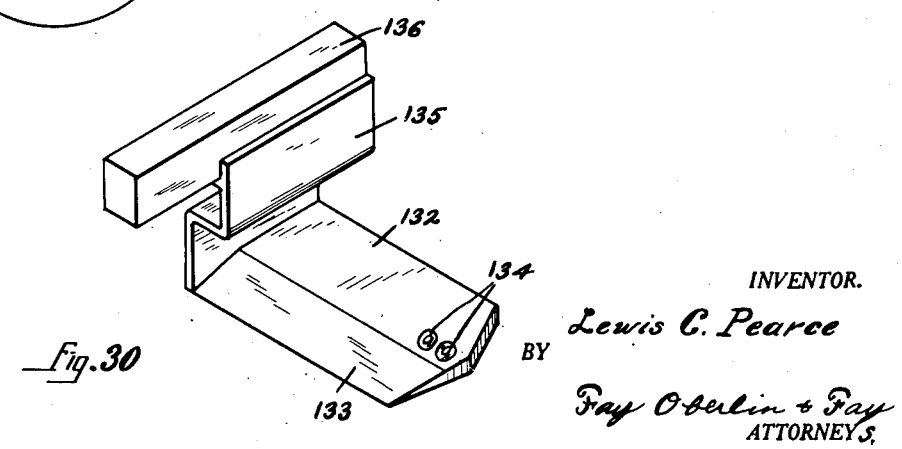
Fig. 30
INVENTOR.
Lewis C. Pearce
BY
Fay Oberlin & Fay
ATTORNEYS.

Patented Oct. 17, 1933

1,931,155

UNITED STATES PATENT OFFICE 1,931,155

METHOD OF AND APPARATUS FOR APPLYING ENVELOPE FASTENERS

Lewis C. Pearce, Cleveland, Ohio, assignor to The Standard Envelope Manufacturing Company, Cleveland, Ohio, a corporation of Ohio Application December 21, 1931
Serial No. 582,223

14 Claims. (Cl. 1—2)

The present invention relates to an apparatus for automatically applying fastening staples or clasps and reenforcing patches to envelopes, as well as placing printed matter thereon. One object of the present invention is to provide a machine whereby the above mentioned operations may be performed on a quantity production basis eliminating for all intents and purposes the element of manual labor.

It is a further object to provide a machine which will accommodate a wide range of envelope sizes; a machine in which the possibility of tearing and mutilation of the envelopes will be practically obviated; and furthermore, a machine which will insure a uniform product. It is another object to provide various precautionary devices which will serve to temporarily terminate the actuation of certain portions of the mechanism of the apparatus in case an envelope is not fed through the machine, thus eliminating the waste of materials and preventing the possibility of clogging and damaging the moving parts.

Still another object is to provide a novel form of mechanism for feeding and punching the metallic clasps which are fed into the fastener applying mechanism.

Throughout the specification and claims it will be seen that the subject matter of this application is directed to a means for applying a fastener to an envelope but, of course, it will be understood that the fastener may just as well be applied to other similar articles and that an envelope is used only for convenience of description. To the accomplishment of the foregoing and related ends, said invention, then, consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

In said annexed drawings:

Fig. 1 shows an envelope without the fastener attached.

Fig. 2 shows the fastener attached to the envelope.

Figs. 3 to 7 inclusive are various views illustrative of the form of metallic clasp or staple which is to be fastened to the envelope.

Fig. 8 is a section taken substantially along line 8—8 of Fig. 2.

Figs. 9 and 10 show the gummed paper strip which is applied to the flap of the envelope as a means of reenforcement.

Fig. 11 shows the perforated patch as finally applied to the flap of the envelope.

Figure 12:
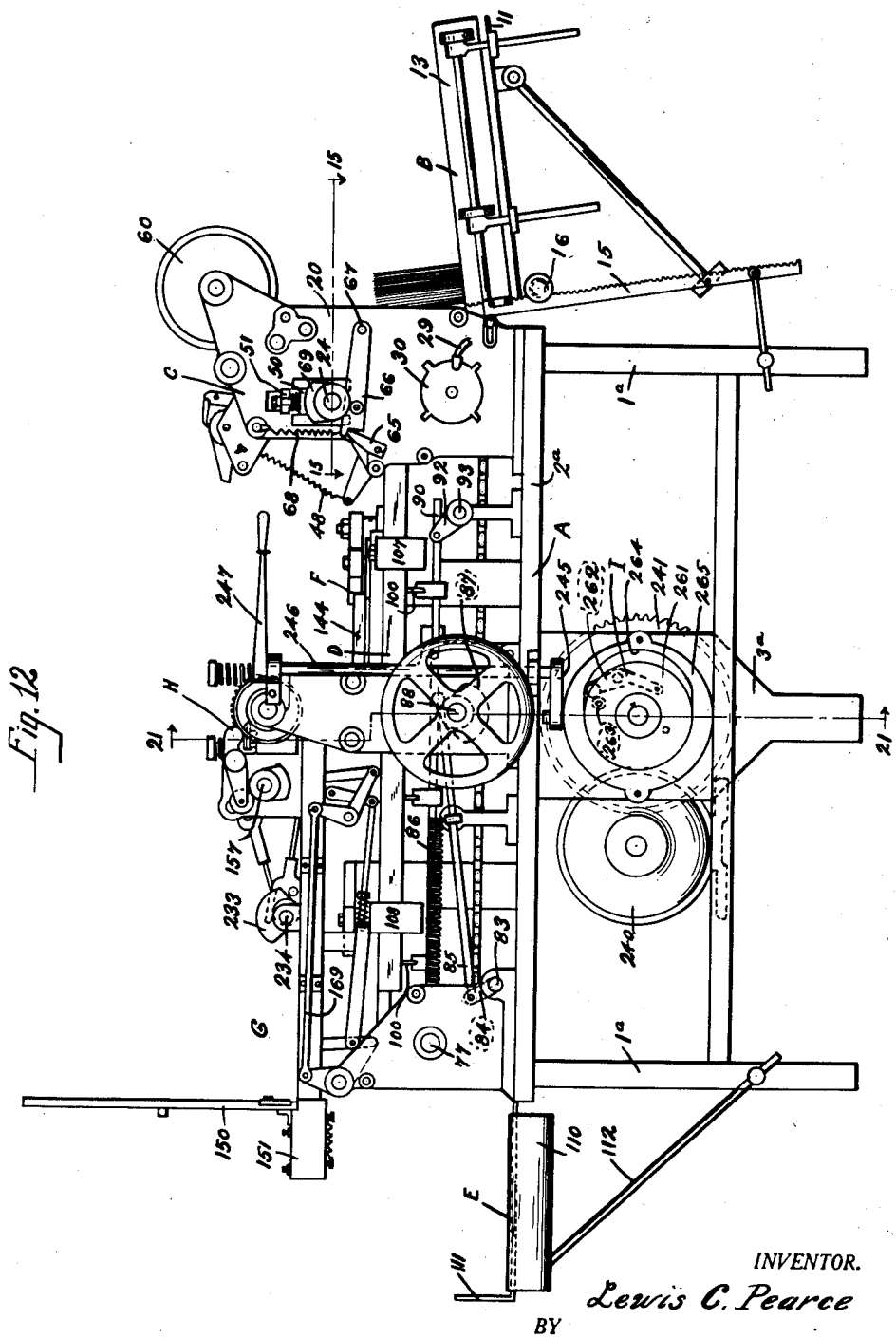

Fig. 12 is a front elevation of the machine.

Figure 13:
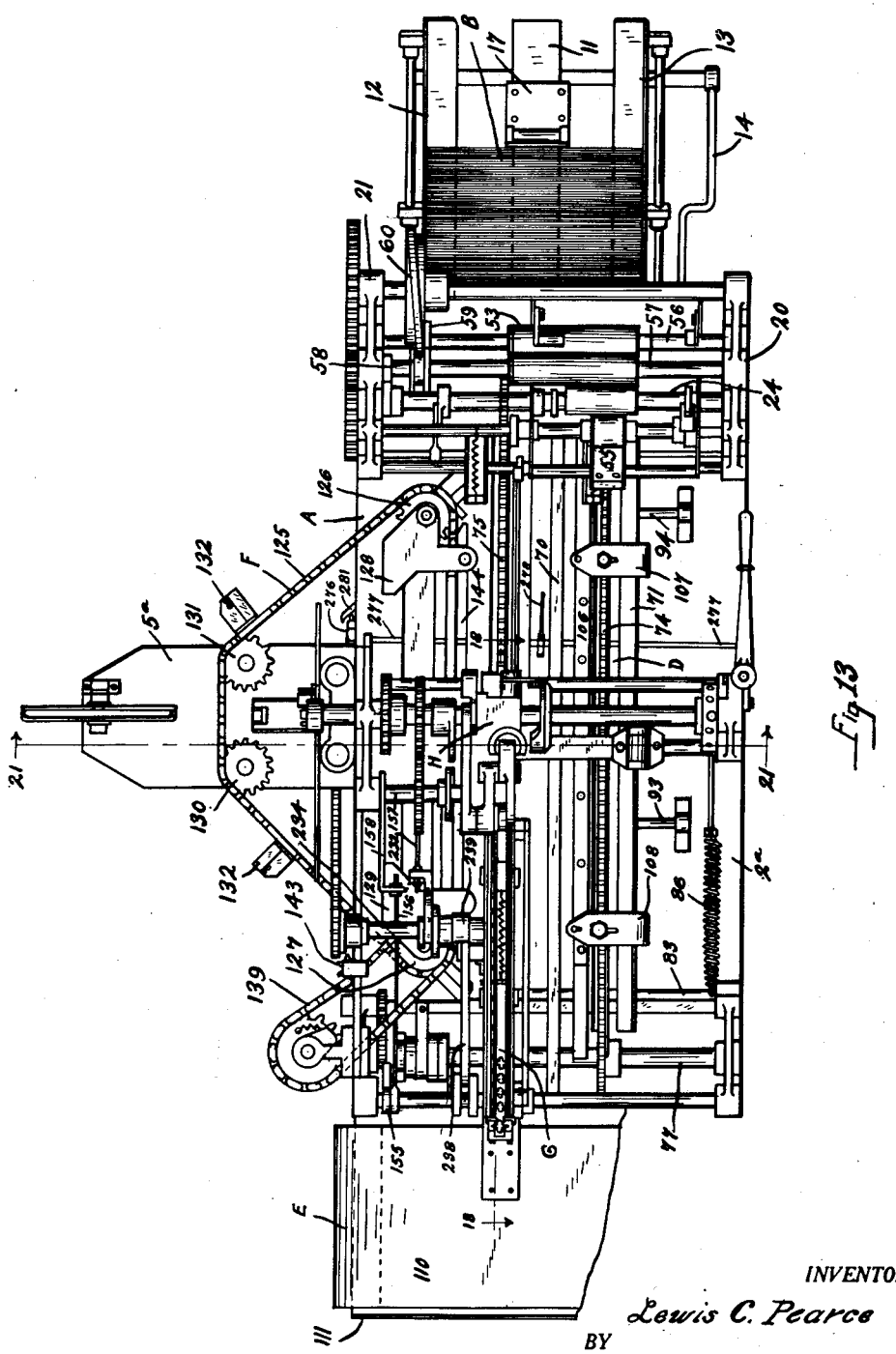

Fig. 13 is a top plan view.

Figure 14:
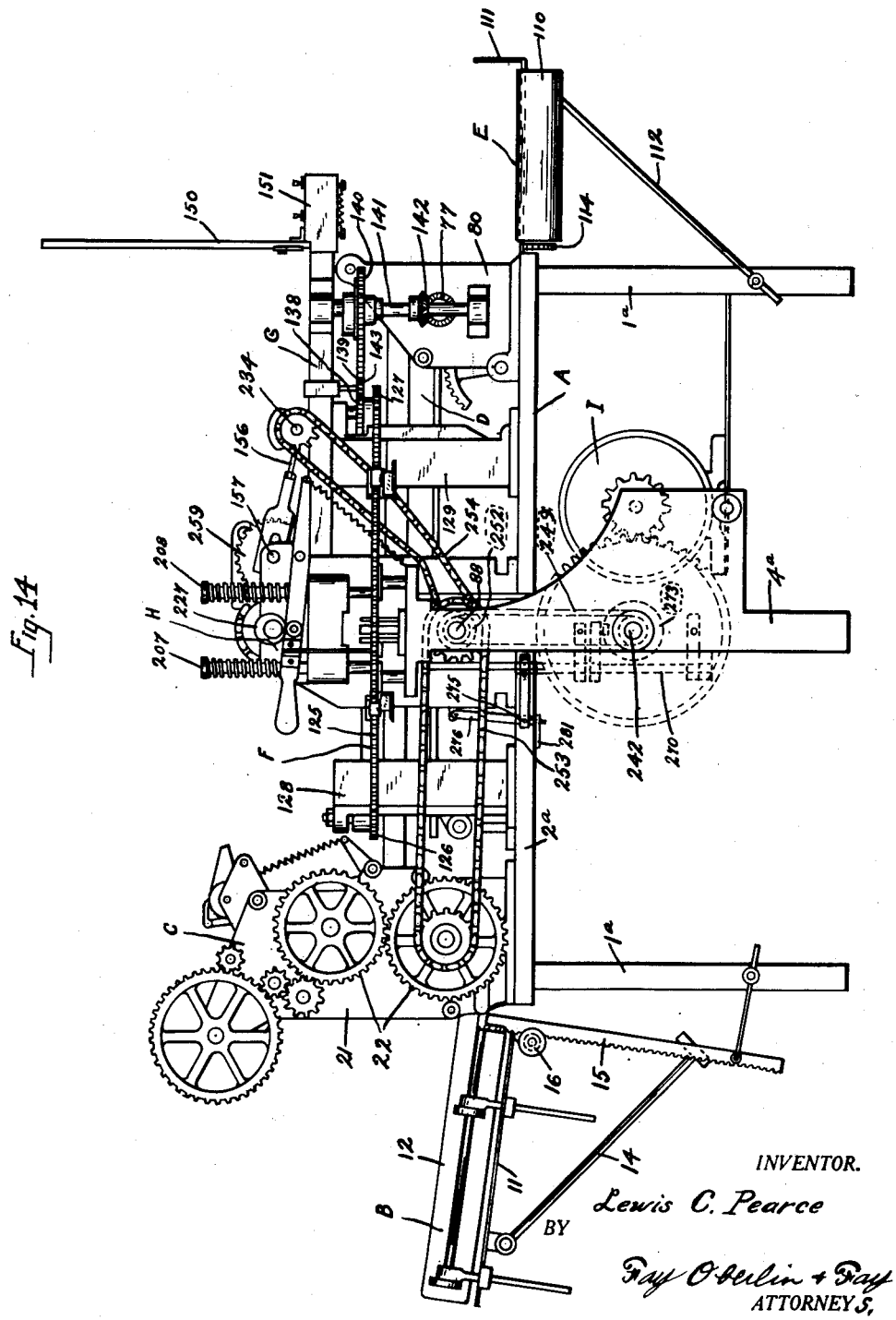

Fig. 14 is a rear elevation.

Figure 15:
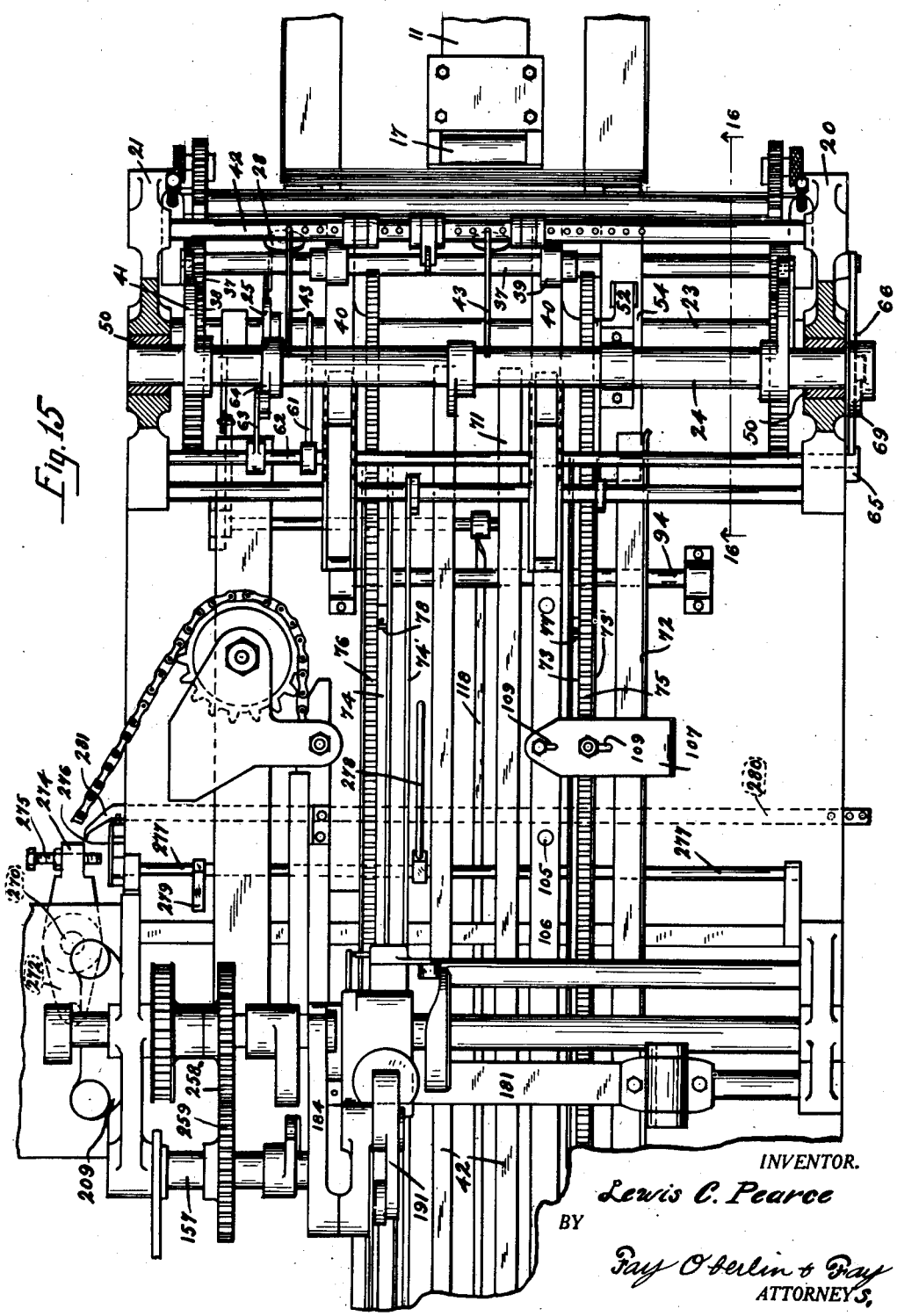

Fig. 15 is an enlarged partial top plan view of the right hand side of the machine, including a section taken substantially upon the line 15—15 of Fig. 12.

Figure 16:
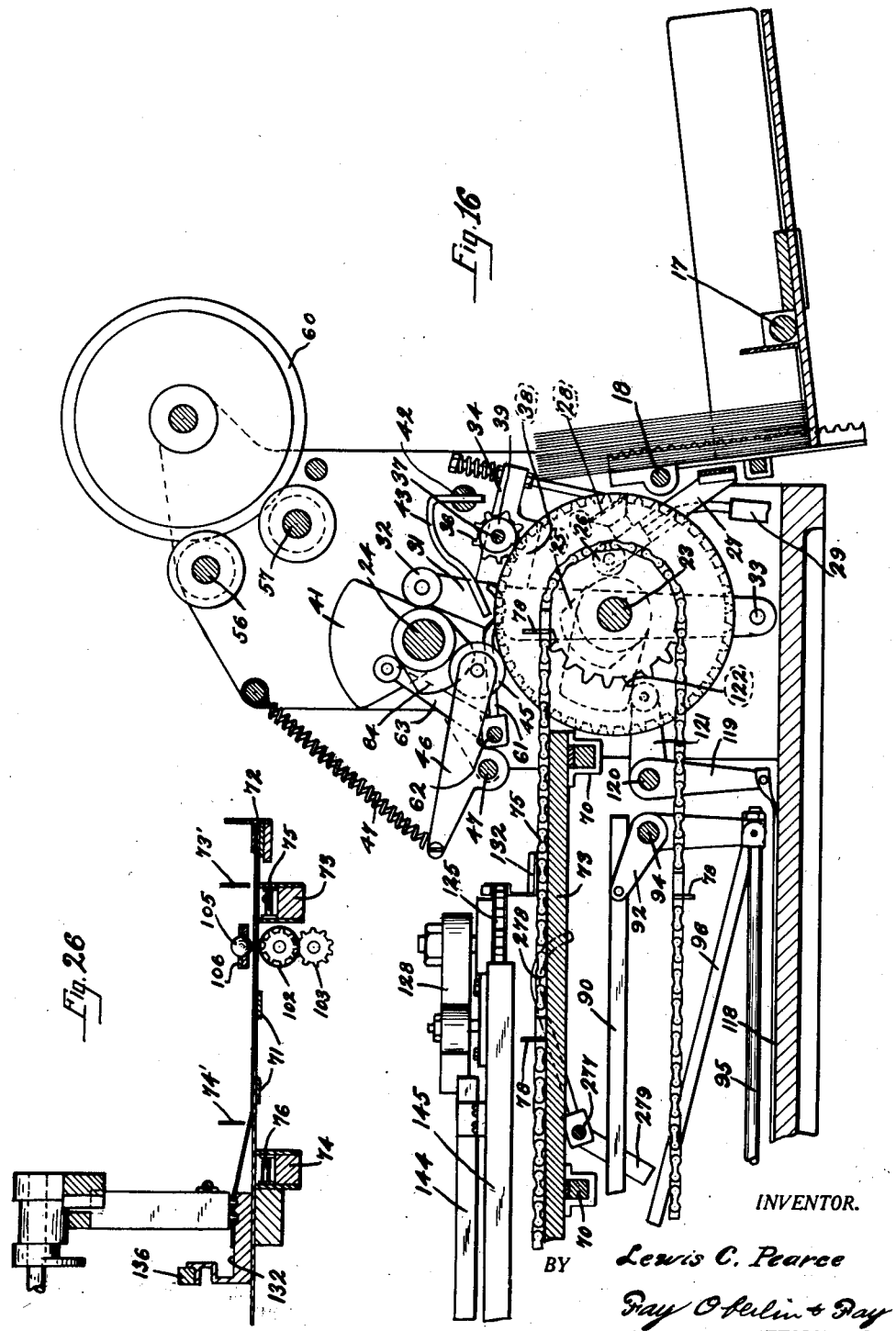

Fig. 16 is an enlarged vertical detail section taken substantially upon the line 16—16 of Fig. 15.

Figure 17:
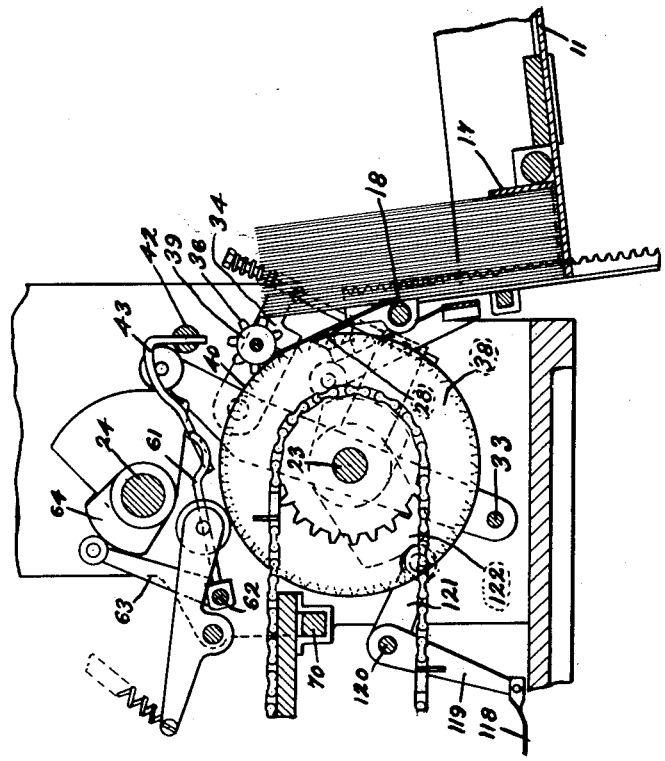

Fig. 17 is a view similar to Fig. 16, but showing the parts in different position.

Figure 18:
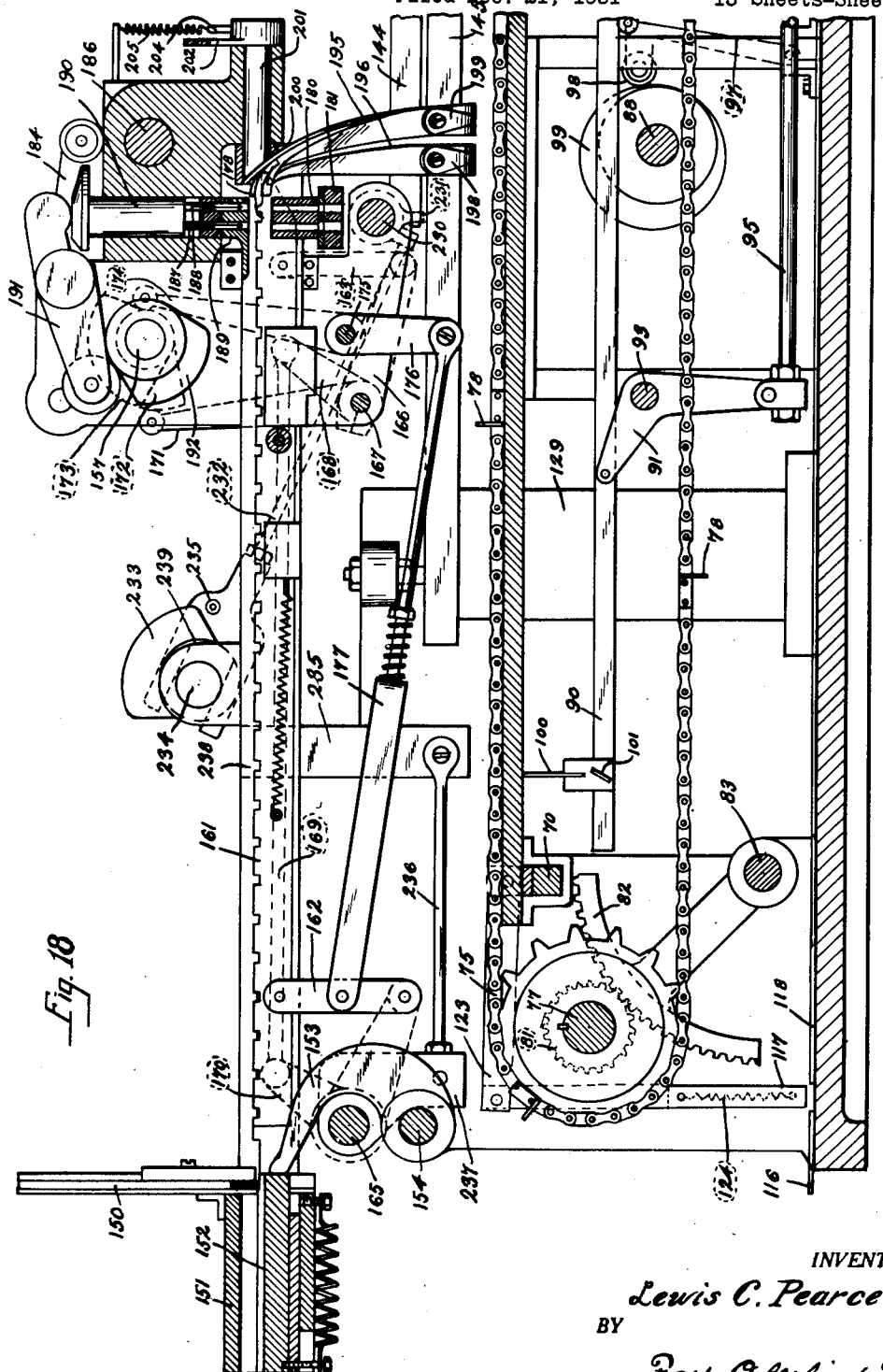

Fig. 18 is an enlarged detail vertical section of the left hand end of the machine taken substantially upon the line 18—18 of Fig. 13.

Figs. 19 and 20 are fragmentary details of Fig. 18 showing the parts in different operative positions.

Fig. 21 is a transverse vertical section taken substantially upon the lines 21—21 of Figs. 12 and 13.

Fig. 22 is an enlarged vertical section of the fastener applying mechanism.

Fig. 23 is an elevational view similar to Fig. 22, but showing the parts in a different operative position.

Fig. 24 is a perspective view of the metal clasp feeder.

Fig. 25 is a perspective view of the opposite side of Fig. 24.

Fig. 26 is a fragmentary sectional view of Fig. 21, showing an enevelope in position upon the machine.

Fig. 27 is an enlarged top plan view of the left hand end of the machine.

Fig. 28 is a detail of the automatic counter mechanism.

Fig. 29 is a detail of the printing arm and platen.

Fig. 30 is a perspective view of the fastening punch anvil.

Fig. 31 is a detail of a portion of the clutch mechanism.

Briefly outlined, the operative functions of the hereinafter described apparatus are intended to be applied upon the form of envelopes shown in Fig. 1, which consists of the overlapping lateral flaps 1, 2 and 3 which are suitably glued together along their respective contacting edges. The open end flap 4 is adapted to be bent back and secured by the ends of the metal clasp 5 extending through the perforated reenforcement patch 6. Referring to Figs. 3 to 8 especially, the metal clasps are supplied in the blank form as shown in Figs. 3 and 5, a pair of punch perforations 7 are made in the web of the clasp, and it is then secured to the envelope as shown in Fig. 8 by means of bending back or clinching the points 8 of the perforations 7. The reenforcing patches 6 are supplied to the machine in the form of a continuous gummed strip 9 shown in Figs. 9 and 10; and the strip is cut along the lines 10—10 and the resultant square patches are glued to the flap 4 of the envelope and a perforation made therethrough.

The novel form of apparatus, which I have conceived in order to automatically accomplish the above described operations, will now be more specifically described according to the subordinate elements of the entire assembly and in an order conforming as near as possible to the chronological occurrence of the various mechanical operations performed upon the envelope.

Directing attention to the general assembly views, Figs. 12 to 14, inclusive, the machine will be found to essentially consist of the following generally indicated component parts: the supporting base A, envelope rack B, feeding and printing mechanism C, conveyor track D, receiving table E, anvil moving mechanism F, clasp feeding mechanism G, clasp and patch applying stamp head H, and the prime moving mechanism I.

The supporting base A

The supporting frame of the machine, which is essentially in the form of a table, consists of the vertical supporting legs 1a, the base plate 2a, the motor drive supporting legs 3a and 4a, which in turn support the upper base 5a. A lower supporting plate 6a joins the supporting legs 3a and 4a and serves as a base for carrying the driving motor mechanism I.

The envelope rack B

The envelope rack B, which is disposed at the right-hand side of the machine, as shown in Figs. 12 and 13, consists of a base plate 11, to which are attached the adjustable side plates 12 and 13 for accommodating various sizes of envelopes. An inclined supporting arm 14 and the gear toothed rack 15, which is adapted to be engaged by the small adjusting gear 16, serve as means for regulating the relative position of the envelope rack in relation to the machine. A weighted roller 17 is slidably mounted upon the base plate 11 and serves as a means for retaining the stacked envelopes in compacted position against the transverse bar 18.

Feeding and printing mechanism C

The feeding and printing mechanism C, which is best illustrated in Figs. 15, 16 and 17, is carried by the vertical journal plates 20 and 21. A gear train, indicated generally by the numeral 22, is adapted to rotate the various transverse horizontal shafts which are journalled in the plates 20 and 21. The shafts 23 and 24 mount the majority of the mechanism which feed the envelopes individually to the machine. A cam 25 on the shaft 23 coacts with the roller 26 on the end of the supporting arm 27 which mounts the sucker tips 28. A suction hose 29, leading from the sucker tips 28, communicates with the rotary valve 30 on the outside end of the shaft 23. A lever arm 31, carrying on its uppermost end the roller 32, is pivoted at the point 33 and carries the laterally extending arm 34. A small pinion 36 mounted upon the shaft 37 in the lateral arm 34 meshes with the large gear 38, which latter is in turn keyed to the shaft 23. The small gear 36 carries the roller 39 which is adapted to bear against the perpihery of the large feed roller 40, also carried by the shaft 23.

Directing attention particularly to Figs. 16 and 17, the operation of the envelope feeding mechanism is as follows: The sucker tips 28 pull the innermost of the stack of envelopes around the transverse bar 18. The cam 41 on the shaft 24 then moves the lever arm 31 in a clockwise direction so that the envelope is engaged between the rollers 39 and 40 and carried in a counter-clockwise direction through the mechanism.

A stationary transverse bar 42 carries a plurality of bent fingers 43 which are adapted to bear against the envelope and guide its travel around the rollers 40. Another pair of rollers 45 carried by the lever arm 46, pivoted on the shaft 47 and held against the periphery of the rollers 40 by means of the tension spring 48, also serve to guide the travel of the envelopes.

The shaft 24 is mounted at each end in the slidable bearing blocks 50 which are held in a downward position by means of the compression spring 51. The latter construction is best shown in Fig. 12.

Now directing attention to Figs. 15 and 29, the shaft 24 carries the printing arm 52 which is adapted to bear against the printing rollers 53 and the platen 54, whereby printed matter may be placed upon the envelopes as they are fed through the mechanism. An ink feeder 55 contacts with the inking rollers 53 which are in turn carried upon the shafts 56 and 57. A pair of grooved pulleys 58 and 59 mounted upon the ends of the shafts 56 and 57, respectively, coact with the spiral shoulder on the wheel 60 and serve to impart an axial oscillation to the inking rollers.

For the purpose of preventing the above described printing mechanism from operating when an envelope is not fed thereto, I have provided the following cut-out device. A finger 61 extends laterally from the shaft 62 which in turn carries the cam lever arm 63 and the latch finger 65. A cam 64 on the shaft 24 imparts an oscillating action to the latch finger 65. Directing attention to Fig. 12, it will be seen that the latch finger 65 is adapted to engage under a notch in the end of the bar 66 pivotally supported at the point 67. A tension spring 68 tends to retain the end of the bar 66 in uppermost position.

In operation, when an envelope is fed to the machine, the finger 61 will be raised by reason of contact with the surface of the envelope whereby the latching finger 65 will be held out of contact with the notch in the end of the bar 66, permitting the printing arm 52 to contact with the platen 54. But when an envelope is not fed to the mechanism, the finger 61 will not be raised, leaving the latch finger 65 in engagement with the end of the bar 66. In which circumstance the eccentric 69 on the end of the shaft 24 will bear against the upper edge of the bar 66, serving to raise the shaft 24 and preventing the printing arm 52 from contacting with the platen 54.

Conveyor track D

After the envelopes have been individually selected from the supply rack and printed, they are delivered in a horizontal position upon the surface of the conveyor track D which extends longitudinally across the machine. The conveyor track is carried by a plurality of transverse supports 70 and by reference to Figs. 15, 16, 17, 18, 26 and 27, especially, will be seen to consist of the flat intermediate bearing strips 71, the angle beam 72 and the channels 73 and 74. The endless chains 75 and 76 are adapted to travel within the channels 73 and 74, respectively, and are carried at each end by suitable sprocket wheels mounted upon the shaft 23 at one end and the shaft 77 at the other end of the machine. The endless chains 75 and 76 do not extend above the upper edges of the channels 73 and 74. They do carry, however, a plurality of perpendicular projecting fingers 78 which are adapted to engage with the edges of the envelopes and propel the latter across the surface of the trackway.

Referring to Figs. 15 and 26, a pair of guide strips 73' and 74' may be suitably suspended above the trackway as additional means for guiding the passage of the envelopes. A sprocket shaft 77 on the left-hand end of the machine is journalled in the vertical supporting plates 79 and 80. The shaft 77 carries the ratchet gear 81 which is engaged by the gear segment 82 which is in turn mounted upon the shaft 83. A link arm 84 (Fig. 12) connects the shaft 83 to the rod 85 which is in turn engaged by the eccentric 87 mounted upon the central transverse drive shaft 88. The tension spring 86 in conjunction with the action of the eccentric 87 serves to impart a reciprocable action to the rod 85, with the result that the gear segment 82 rocks back and forth along the ratchet gear 81.

It will thus be seen that continuous rotation of the central drive shaft 88, through the above described mechanism, will impart an intermittent movement to the endless conveyor chains 75 and 76.

It will thus be seen that the hereinabove mechanism provides means whereby the individual envelopes are selected one at a time, printed and placed upon the bed of the conveyor track, and then moved in an intermittent or step by step motion across the length of said conveyor track. For the purpose of properly aligning the envelopes throughout their travel across the conveyor and to correspondingly insure a more precise and uniform product, I have provided the following alignment means.

A bar 90 is disposed directly beneath the conveyor track and is mounted upon the bell crank lever arms 91 and 92. The latter elements 91 and 92 are pivoted upon the transverse shafts 93 and 94 respectively. Particular reference to Figs. 12, 13, 15, 16 and 18 will serve to best illustrate the instantly described mechanism. A lower tie bar connects the downwardly disposed lever arms of the bell crank levers 91 and 92. A connecting bar 96 extending from the right hand end of the tie rod 95 to the pivoted link 97 receives a subsequent horizontal reciprocal movement through the roller 98 and eccentric 99 from the rotation of the central transverse drive shaft 88. The bar 90 carries a number of perpendicularly extending fingers 100 which may be made adjustable on said bar by means of the wing nuts 101. Reciprocal movement of the connecting rod 96 and the tie rod 95 transmitted to the rock shafts 93 and 94 will correspondingly serve to raise and lower the fingers 100 above the upper horizontal plane of the conveyor track. The result is that said fingers 100 being intermittently projected above the plane of the track will serve as limit stops contacting with the lateral edges of the envelopes at the various stations of passage of the latter tending to insure a correct alignment and disposition of each envelope at its respective stopping stations.

Additional alignment means, as best shown in Figs. 15, 21, 22, 23 and 26 consist of the longitudinal shaft 102 bearing against the under surface of the envelopes and rotated in a direction indicated by the arrows in Figs. 22 and 23 by means of the pinion gear 103 and worm 104 mounted upon the central drive shaft 88. A plurality of balls 105 positioned in circular recesses in the supporting strip 106 rest upon the upper surface of the envelopes and functions as a means for retaining the latter in contact with the rotating shaft 102.

Referring again to Figs. 22 and 23, it is apparent that the rotation of the shaft 102 being in a counter-clockwise direction has a tendency to urge the bottom or closed end of the envelopes against the flange 72 at all times, and hence maintaining such envelopes in perpendicular alignment in relation to their line of travel along the conveyor track.

The ball supporting strip 106 is supported by means of the U-shaped brackets 107 and 108. The securing bolts in the U-shaped brackets 107 and 108 are carried in longitudinal slots 109 which permit the variable lateral adjustment of the position of the supporting strip 106 in order to accommodate various sizes of envelopes.

Briefly reviewing the mechanism described up to the present point, it is apparent that the envelopes have been selected, printed, fed to the conveyor track, intermittently moved across the surface of said track and maintained in proper alignment during their passage over the latter. Upon reaching the left hand end of the conveyor track D, the envelopes are then disposed upon the

Receiving table E

The receiving table E, the construction and correlated mechanism of which is best illustrated in Figs. 12, 13, 14 and 16 and 28 consists essentially of the endless belt 110 and the perpendicular guiding flange 111. The supporting bracket 112 secures the receiving table E to the vertical leg 1a of the machine. Now referring more particularly to Fig. 28 the mechanism for moving the endless belt 110 consists of the cylindrical drum 113 upon which is mounted the ratchet wheel 114. A connecting link 115 actuates the ratchet wheel 114 and receives a reciprocal movement through the bell crank 116, the vertical latch finger 117, and the horizontal connecting rod 118. The connecting rod 118 is attached to the lever arm 119 (Figs. 16 and 17) which in turn is secured to the transverse rock shaft 120. An actuating lever 121 for the rock shaft 120 is contacted by the eccentric 122 mounted upon a shaft 23. It will thus be seen that rotation of the shaft 23 will, through the last above described mechanism impart an intermittent movement to the endless belt 110 with the result that the envelopes as received from the end of the conveyor track D will be progressively distributed across the length of the receiving table E.

It is also contemplated to install a mechanical counter, various forms of which are well known to the art, in conjunction with the ratchet wheel 114. In order to temporarily terminate the movement of the endless belt 110 in case an envelope is not disposed thereon, there is provided the horizontal trigger 123 which extends slightly above the upper plane of the conveyor track due to the action of the light tension spring 124. In operation, when an envelope passes over the trigger 123 the latch 117 will be depressed to a position in registry between bell crank lever arm 117 and the tie rod 118 so that mechanical reciprocating motion will be transmitted to the ratchet wheel 114. In the absence of the passage of an envelope over the trigger 123, however, the latch finger 117 will correspondingly not be depressed and the reciprocal motion of the tie rod 118 will be entirely lost so that there will be no resultant movement of the ratchet wheel 114.

Anvil moving mechanism F

For the purpose of inserting an anvil means under the open end of the aligned envelope as it is progressively moved from station to station along the conveyor track, there has been provided the following described mechanism; referring particularly to Figs. 13, 14, 16, 27 and 30, the anvil moving mechanism consists of an endless chain 125 carried by the sprockets 126 and 127 mounted in the supporting frames 128 and 129 respectively. The sprockets 100 and 131 mounted upon the base 5a complete the group of carrying sprockets for the chain 125. A plurality of anvils indicated generally by the numeral 132 and whose more detailed construction is better shown in Fig. 30 are carried at equidistant points throughout the length of the chain 125. The anvils 132 have a leading beveled edge 133 for insertion under the open end of the envelope. A pair of rivet dies 134 provided on the top face of the anvil for the purpose of coacting with the clasp riveting dies which shall be presently hereinafter more fully described. A vertical offset portion or channel 135 is provided in the anvil for the reception of the chain 125. A registering block 136 is also carried on top of the channel 135 for the purpose of more accurately guiding the travel of the anvil 132 in a manner which shall subsequently become apparent.

The endless chain 125 is intermittently driven in synchronization with the conveyor track through the drive mechanism consisting of the sprocket wheel 138 (Fig. 14) mounted upon the same shaft as the sprocket 127, the chain 139 to the sprocket wheel 140 upon the vertical shaft 141; and a beveled gear transmission 142 connecting the shaft 141 to the end of the conveyor track drive shaft 77. An idler sprocket 143 may be provided for the purpose of properly tensioning the connecting chain 139.

As the anvils 132 travel in a path coincident with that of the conveyor trackway D they are guided by the longitudinal trackways 144 and 145. The manner in which the flange 135 and block 136 of the anvil 132 register with the trackways 144 and 145 may be most clearly seen by reference to Figs. 22 and 23.

In the operation of the above described anvil mechanism it will be apparent that the anvils, as they move around the sprocket 126 enter the open end of the envelope with a gradual or sweeping motion which insures a positive entering action. It will further be seen that since the anvil moving mechanism is driven directly from the conveyor track drive shaft 77 that said anvils will move synchronously with the envelopes, starting and stopping at each intermittent station of passage which the travel of the envelopes undergoes.

Clasp feeding mechanism G

The clasp feeding mechanism G may be most clearly described by particular reference to Figs. 18, 19, 20, 22, 23, 24, 25 and 27. A clasp blank supply holder 150 is mounted upon the base block 151 and adapted to receive a vertical stack of clasp blanks such as are illustrated in Figs. 3 and 5. A spring loaded feeder block 152 is mounted within the base block 151 and operates to extract the clasp blanks one at a time from the bottom of the stack. A cambered lever 153 abuts against the inner end of the reciprocal feed block 152 and is adapted to impart the reciprocal motion thereto. The lever 153 is mounted upon the transverse shaft 154 which is in turn connected by means of the lever arm 155 and connecting rod 156 to a yoke and eccentric mechanism upon the shaft 157 (Fig. 13).

The last above described mechanism serves to deposit the clasp blanks individually upon the stationary pair of stationary feed bars 160. Another pair of movable feed bars 161 are positioned against the inner sides of the stationary feed bars 160 and are given a substantially rectangular path of movement (in a vertical plane) by means of the following described mechanism.

The end portions of the movable feed bars 161 are supported upon the link arms 162 and 163. The link arm 162 connects with the lever arm 164 mounted upon the transverse shaft 165. The link arm 164 connects with the lever arm 166 mounted upon the transverse shaft 167. Another lever arm 168 upon the shaft 167 is connected through the connecting rod 169 to the lever arm 170 mounted upon the shaft 165. A reciprocal rock motion is transmitted to the shafts 167 and 165 by means of the cam lever arm 171 contacting with the cam 172 mounted upon the rotatable shaft 157. Another cam 173 reciprocates the lever arm 174 mounted upon the rock shaft 175. The lever arm 176 mounted upon the rock shaft 175 connects through the elastic-joint connecting link 177 to the supporting link arm 162.

Directing attention particularly to Figs. 18, 19 and 20, the operation of the above described clasp blank feeding bars is as follows: The clasp blank is first deposited in the end notch of the stationary bar 160 (Fig. 19); oscillation of the rock shafts 165 and 167 in a counter clockwise direction then serves to raise the movable feed bar in a vertical direction and to a position as shown in Fig. 20.

After attaining the lateral position, the rock shaft 175 is then actuated and the link arm 162 is moved in a clockwise direction with the result that the clasp blank is moved one notch further to the right as shown in Fig. 18.

It will thus be seen that the clasp blanks are moved in a step by step operation across the top surface of the feed bars 160 and 161. The feed bars are placed in a readily accessible position so that in case a clasp blank is not properly fed thereto from the supply holding rack 150, the operator may very easily insert a blank upon the bars by hand.

The end notch 178 in the movable feed bar 161 places the clasp blank immediately above the lower female punching die 180. Now directing attention to Fig. 21, the lower female die 180 is mounted upon the base plate 181 which is in turn pivotally supported upon a bearing 150

182. The end of the base plate 181 immediately adjacent the female die 180 is connected through the spring loaded rod 183 to the oscillatable cam lever 184. Referring now to Figs. 22 and 23, the cam lever 184 receives its reciprocal motion from the cam 185 mounted upon the rotatable shaft 186.

The upper clasp blank punching dies 187 and 188 are slidable in the fixed guide 189, and carried by the reciprocal plunger 190. The plunger 190 is adapted to be reciprocally operated by means of the cam lever arm 191 contacting with the cam 192 on the end of the shaft 157. (See Figs. 18 and 19.) Triangularly spaced spring loaded plungers 193 engage under the mushroom head of the plunger 190 and function to impart positive upward return action to the plunger.

Directing attention particularly to Figs. 18 and 19, the operation of the last described clasp blank punching mechanism is as follows. The clasp blank is held on the last notch 178 of the movable feeding bar 161; simultaneously the lower female die 180 moves upward to pick the clasp blank from the notch 178 and hold it against the bottom face of the upper die guide block 189; the plunger 190 is then moved to downward position and the openings are punched out of the web of the clasp blank, resulting in the form of clasp as shown in Figs. 4, 6 and 7.

The punched out clasps are then fed into the feeding chute which is best illustrated in Figs. 18, 19, 22, 23, 24 and 25. The clasp feeding chute 195 is twisted from its upper to its lower end through an angle of 90°. A longitudinal central opening 196 is provided for the registry of the punched out edges of the clasp web holes. The lower end of the feed chute also has another central opening 197 on its upper side for a purpose which shall presently be more particularly set forth. A pair of resilient clasps 198 and 199 have projecting fingers on their ends for removably retaining the clasps in the chute.

The upper end of the chute is mounted upon a block member 200 which in turn is carried by the rock shaft 201. The outer end of the rock shaft 201 carries a cam lever 202 which is adapted to engage with the lateral track of the cam disc 203. Another lever arm 204 attached to the tension spring 205 is for the purpose of imparting return motion to the rock shaft 201. The above described mechanism accomplishes the purpose of individually feeding and punching out the metallic clasp blanks and delivering them to a point where they may be attached to the envelopes by means of the mechanism which shall next be described.

Clasp and patch-applying stamp head H

The mechanism whereby the metallic clasps or staples 5 and the paper patches 6 are applied to the envelope is herein referred to for the purpose of convenient reference as the "stamp head" which consists of the upper base block 206, one end of which is carried by the vertical spring loaded rods 207 and 208. The spring loaded rods 207 and 208 are reciprocal in the frame member 209. A roller 210 mounted upon the upper portion of the base 206 contacts with the periphery of the eccentric tool 11 which is in turn mounted by the shaft 186.

A pair of spring loaded disappearing fingers 213 and 214 are carried by the stamping block 212 which is in turn mounted on the inner end of the base 206.

Subsequently adjacent the stamping block 212 is found the perforating punch 215 which is also carried by the stamp head base 206. The perforating punch 215 is surrounded by a reciprocal sleeve 216 which is in turn carried by and spring loaded upon the stud 217. A spring loaded disappearing finger 218 is secured to the opposite side of the sleeve 216. A cutting bar 219 extends to a point immediately contiguous to the vertical path of travel of the sleeve 216. A lower punching die 220 is provided for the reception of the end of the perforating punch 215.

A roll of gummed tape 9 is positoned upon the reel 221 and fed between the knurled feed wheels 222 and 223. A ratchet is mounted upon one side of the feed wheel 223 and is adapted to be engaged by the pawl 224 on the end of the vertical connecting arm 225. The arm 225 in turn connects to the horizontal lever arm 226 which is adapted to be oscillated by means of the eccentric 227 on the end of the shaft 186. A water reservoir 228 is provided for the purpose of moistening the gummed surface of the tape 9 through the medium of the lower feed roll 222.

It will thus be seen that means have been hereinabove described whereby the clasps and the gummed tape are fed to points immediately adjacent the under side of the stamp head mechanism. The manner in which the clasps and patches are applied to the envelope will now be described. Referring to Fig. 22, it will be seen that the clasp-feeding chute 195 presents its lower end substantially beneath the stamping block 212 whereby the web holes of the clasp are in registry with the disappearing fingers 213 and 214. Upon downward movement of the stamp head base 206, the fingers 213 and 214 extend through the slot 197, and pick the clasp from the end of the feeding chute which is simultaneously moved out of position in a clockwise direction of rotation. Further downward movement of the stamp head base 206 serves to press the clasp against the envelope and to bend the edges of the web holes into a clinched form against the lower dies 134 on the anvil 132. The latter operation is best illustrated in Fig. 23.

Referring again to Figs. 22 and 23, the gum strip 9 is simultaneously fed below the perforating punch 215. Downward movement of the perforating punch 215 and its enclosing sleeve 216 serves to cut off the patch 6, press it against the surface of the flap 4 of the envelope, and then perforate both the patch and the envelope flap.

Since it is of utmost importance that the movable anvils 132 be held in proper registry and alignment during the above described operation, I have provided a mechanism, as best shown in Figs. 18 and 19, which consists of a downwardly projecting stop finger 230 adapted to abut against the upper stop block 136 carried by the anvil 132. The stop finger 230 is mounted upon the rock shaft 231 which in turn receives its reciprocal motion through the connecting rod 232 and the yoke and eccentric mechanism 233 mounted upon the shaft 234.

The stop finger 230 will therefore be alternately moved and removed into the path of the stop block 136 on the anvil 132, so that a firm abutment will be provided which produces a uniform and positive alignment of the anvil upon each positioning thereof below the stamp head.

After the clasps and patches have been applied to the envelope at its station immediately below the stamp head, it is next moved to a station below the clinching hammer 235, whereby another blow is imparted to the clasp in order to insure its firm attachment to the envelope. The clinching hammer 235 has its lower end secured to the cross bar 236 which is in turn pivotally mounted by means of the boss 237 upon the shaft 165. The upper end 238 of the clinching hammer 235 has a lateral projection which is adapted to contact with the eccentric 239 on the shaft 234.

*Prime moving mechanism I*

The prime moving mechanism I, which is adapted to impart driving motion to each and all of the above described sub-assemblies, consists of the electric motor 240 which drives the large gear 241. The large gear 241 is rotatably mounted upon the shaft 242 which in turn is journaled in the vertical supporting plates 3a and 4a (Figs. 12 and 21). A suitable clutch 243 serves to connect the driving motion of the gear 241 to the shaft 242. The clutch 243 is controlled by means of the tie rod 244 connecting the link arm 245 on the lower end of the vertical shaft 246 on the front of the machine. The hand operating lever 247 is provided on the upper end of the shaft 246. A sprocket 248 secured to the shaft 242 connects to the central transverse shaft 88 by means of the chain 249 and sprocket 250.

Referring to Figs. 14 and 21, another pair of sprockets 251 and 252 mounted adjacent the sprocket 250 on the shaft 88 are connected by means of chains to the gear train 22 and the auxiliary drive shaft 234, respectively.

It will thus be seen that the above described driving mechanism imparts a constant rotating movement to the gear train 22, the shaft 88 and the shaft 234. The shaft 186, which essentially operates the stamp head and clasp and patch applying mechanism, and is intended to be rendered inoperative when an envelope is not carried by the conveyor track D, is driven through the following described mechanism. A sprocket 255 is rotatably carried upon the right hand end of the shaft 242 (Fig. 21) and is connected to the shaft 186 by means of the chain 256 and sprocket 257. The gear wheel 258 on the shaft 186 meshes with the gear 259 on the shaft 234. The sprocket 255 is secured to the circular plate 260 which is in turn rotatably mounted in the fixed housing 265. Another disc 261 keyed to the shaft 242 carries a pivoted cam and roller 262, (best shown in Fig. 31). The pivoted cam 262 is adapted to engage with the laterally extending lug 263 upon the face of the plate 260 when the presently described mechanism is in engagement and to travel the eccentric track portion 264 of the housing 265 when the clutch is out of engagement. The housing 265 is carried by a pair of horizontal arms 266 and 267 which are connected to the lever arms 268 and 269 respectively upon the shaft 270.

A roller 271 carried by another lever arm 272 mounted upon the shaft 270, but extending in a direction opposite to that of the lever arms 268 and 269, is adapted to contact with the lateral cam track surface 273.

The operation of this last described clutching mechanism is as follows: When the arm 272 is on the highest point of the cam track 273, as shown in Fig. 21, the housing 265 will be drawn to a position to the left, whereby the cam arm 262 will be permitted to travel around the eccentric portion 264; when the arm 272, however, rides upon a position corresponding to the lower portion of the cam track 273, the housing 265 will be moved to a right hand position and the cam arm 262 will be forced to abut against the projection 263 on the plate 260, whereby the rotary motion of the shaft 242 and plate 261 will be imparted to the plate 260 and sprocket 255.

In order operably to control the operation of this clutching mechanism, another lever arm 274 is provided upon the upper end of the vertical shaft 270 and extending in the same direction as the lever arms 268 and 269. Directing attention to Fig. 15, the lever arm 274 carries an adjusting screw 275 which is adapted to bear against the movable stop block 276. The stop block 276 may be swung into and out of position under the end of the screw 275 by virtue of the fact that it is pivotally attached to the end of the horizontal shaft 277. Further directing attention to Figs. 15 and 16, it will be seen that the shaft 277 carries the detecting finger 278 which is adapted to normally extend above the surface of the conveyor trackway D and to be depressed by the passage of an envelope. A counter-weight 279 is mounted upon the shaft 277 in order to facilitate the ease of movement of the detecting flinger 278. A control lever 280, having the angularly bent finger 281, is also for the purpose of moving the stop block 276.

The operation of the above described detecting mechanism is as follows: When an envelope does not pass over the detecting finger 278, the stop block 276 will be moved to a point of registry beneath the end of the adjusing screw 275, so that the corresponding movement of the lever arms 268 and 269 will be limited and the housing 265 will be retained in its disengaging position.

*Conclusion*

From the description of the above described apparatus, it is manifest that the method of applying the fastening attachments to envelopes which has been conceived according to the principle of my invention, contemplates the straight line movement of an envelope blank in a plane co-incident with the surface of the envelope; the insertion of an anvil in the open end of said envelope with a gradual or sweeping motion which does not tend to damage or injure the envelope and insures the positive entrance of the anvil. The present method of fastener application also provides for the feeding of individualized fastener clasps to a point adjacent the envelope whence it may be quickly and positively applied to the latter.

It should be further remarked that the printing process and mechanism employed in conjunction with my above described apparatus may be so altered as to apply printed matter upon either the front or back face of the envelope during its passage through the machine. The construction of various printing mechanisms are well known to those skilled in the art, and the novel improvements embodied in the subject matter of the present invention may readily be used in correlation with any well known type of printing means so long as the spirit of my invention is not violated.

Other modes of applying the principle of my invention may be employed instead of the one explained, change being made as regards the means and the steps herein disclosed, provided those stated by any of the following claims or their equivalent be employed.

I therefore particularly point out and distinctly claim as my invention:

1. In an envelope fastener attaching machine, the combination of an envelope conveyor disposed in a plane common to the surface of the envelope to be moved thereon, an anvil means operable in substantially the same plane as that of said conveyor and insertable in the open end of said envelopes with a curvilinear motion.

2. In an envelope fastener attaching machine, the combination of an envelope conveyor disposed in a plane common to the surface of the envelopes to be moved thereon, a movable anvil means insertable with a curvilinear motion into the open end of said envelopes and operable in substantially the same plane as that of said conveyor, and means for applying fastening attachments to said envolopes.

3. In an envelope fastener attaching machine, the combination of an envelope conveyor disposed in a plane common to the surface of the envelopes to be moved thereon, a movable anvil means insertable with a curvilinear motion into the open end of said envelopes and operable in substantially the same plane as that of said conveyor, means for applying fastening attachments to said envelopes, and means associated with said attachment applying means for intermittently feeding fastener blanks thereto.

4. In an envelope fastener attaching machine, the combination of a horizontally disposed envelope conveyor, and a plurality of horizontally extending anvils synchronously movable with said conveyor and adapted to be inserted in the open end of said envelopes.

5. In an envelope fastener attaching machine, the combination of a horizontal trackway for the passage of said envelopes, means for moving said envelopes along said trackway, an endless chain movable synchronously with said moving means, and a plurality of horizontally extending anvils carried by said chain and adapted to be inserted in the open end of said envelopes.

6. In an envelope fastener attaching machine, the combination of a horizontal envelope conveyor, a plurality of horizontally extending anvils synchronously movable with said conveyor and adapted to be inserted in the open end of said envelopes, and a vertically movable stamp head mounted adjacent said conveyor for applying fastening staples and reenforcing patches on said envelopes.

7. In an envelope fastener attaching machine, the combination of a horizontal envelope conveyor, a plurality of horizontally extending anvils synchronously movable with said conveyor and adapted to be inserted in the open end of said envelopes, a vertically movable stamp head mounted adjacent said conveyor for applying fastening staples and reenforcing patches on said envelopes, and detecting means associated with said conveying means for rendering said stamp head inoperative when envelopes are not fed to said conveyor.

8. In an envelope fastener attaching machine, the combination of a horizontal envelope conveyor, a vertically movable stamp head for applying fastening staples and reenforcing patches on said envelopes, means for intermittently moving said stamp head in sequence with the movement of said conveyor, and a plurality of horizontally disposed anvils synchronously movable with said conveyor and adapted to be inserted in the open end of said envelopes.

9. In an envelope fastener attaching machine, the combination of a horizontal envelope conveyor, a vertically movable stamp head for applying fastening staples and reenforcing patches on said envelopes, and a plurality of horizontally disposed anvils synchronously movable with said conveyor and adapted to be inserted in the open end of said envelopes.

10. In an envelope fastener attaching machine, the combination of a horizontal envelope conveyor, a vertically movable stamp head for applying fastening staples and reenforcing patches on said envelopes, and anvil means insertable in said envelopes with a curvilinear motion.

11. In an envelope fastener attaching machine, the combination of a horizontal envelope conveyor, a vertically movable stamp head for applying fastening staples and reenforcing patches on said envelopes, and a plurality of horizontally disposed anvils synchronously movable with said conveyor and adapted to be inserted in the open end of said envelopes from an angularly inclined direction.

12. A method of applying fastening attachments to envelopes comprising the steps of moving an envelope in a plane coincident with the surface of said envelope, and inserting an anvil in the open end of said envelope in a curvilinear path and in a plane of motion substantially identical to that of the movement of said envelope.

13. A method of applying fastening attachments to envelopes comprising the steps of moving an envelope in a plane coincident with the surface of said envelope, inserting an anvil in the open end of said envelope in a curvilinear path and in a plane of motion substantially identical to that of the movement of said envelope, and applying fastening means to the open end and flap of said envelope during the insertion of said anvil.

14. A method of applying fastening attachments to envelopes comprising the steps of moving an envelope in a plane coincident with the surface of said envelope, inserting an anvil in the open end of said envelope in a curvilinear path and in a plane of motion substantially identical to that of the movement of said envelope, feeding individualized fastening clasps to a position immediately above said envelopes, and then applying said clasps to said envelope during the insertion of said anvil.

LEWIS C. PEARCE.